Patented Apr. 16, 1929.

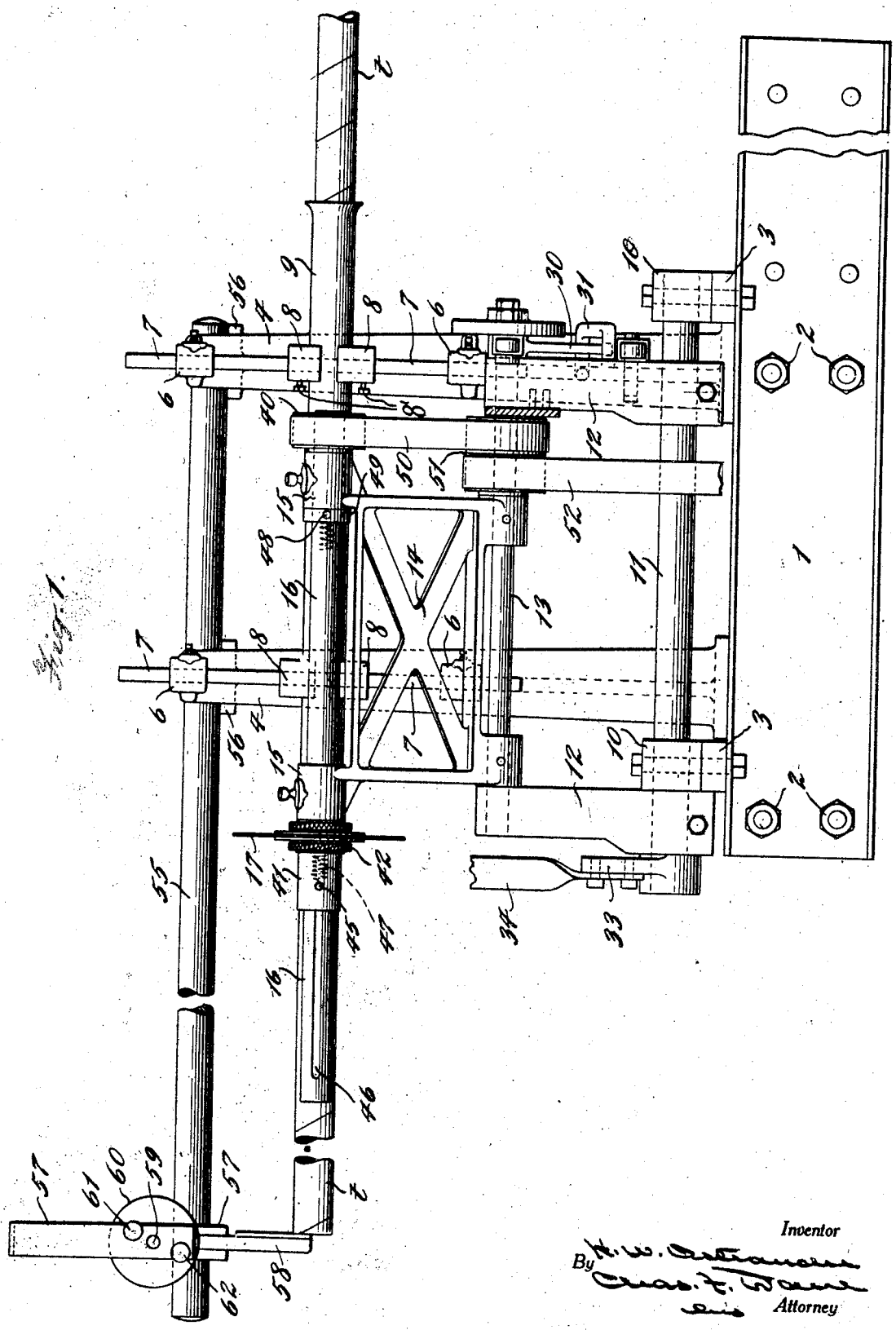

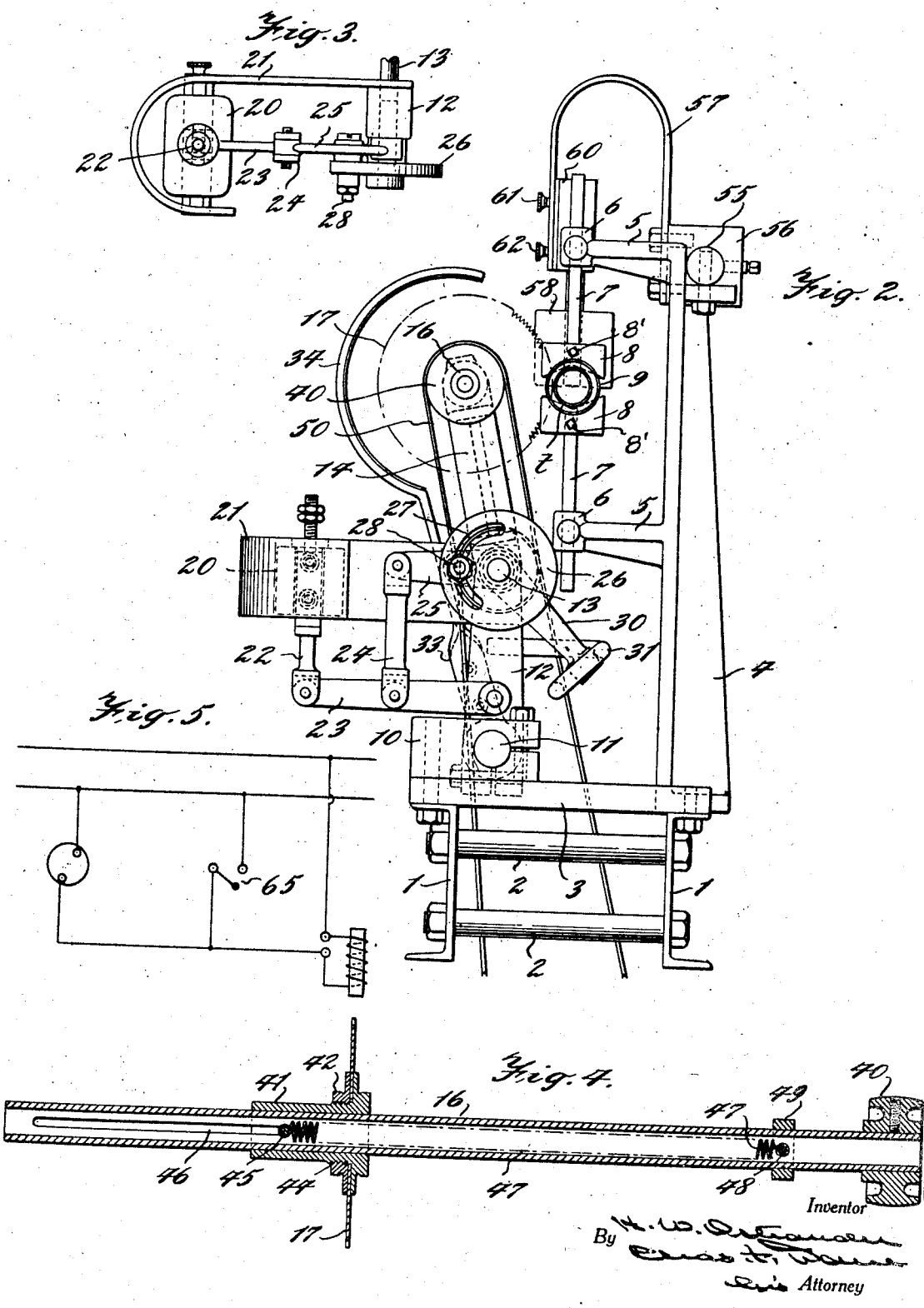

1,709,369

UNITED STATES PATENT OFFICE.

HAROLD WESLEY OSTRANDER, OF GREENWICH, NEW YORK, ASSIGNOR TO M. D. KNOWLTON COMPANY, OF ROCHESTER, NEW YORK, A CORPORATION OF NEW YORK.

MACHINE FOR CUTTING TUBES AND SIMILAR ARTICLES.

Application filed March 24, 1922. Serial No. 546,255.

The invention relates to a machine for cutting tubes and similar articles, produced in continuous lengths, into commercial lengths, the particular form of the apparatus being especially adapted for sawing paper tubes into predetermined lengths.

The invention has for its object to provide a machine of the character described with a rotary saw or equivalent cutting device adapted to be swung to and from cutting relation with the travelling tube, the cutting element moving with the tube until the cutting operation has been completed, after which the said cutting element is retracted from cutting relation and returned to its normal position. The machine further involves means for receiving tubes of different diameters, and an adjustable gauge device for determining the lengths of the tube sections to be cut, which gauge device co-operates with an electric switch controlling the circuit to an electromagnet, which latter acts to move the cutting device into operative position when the gauge device is engaged and moved by the end of the tube passing through the machine.

The invention is illustrated in the accompanying drawings, in which:

Fig. 1 is a front elevation of the apparatus with certain parts removed and broken away;

Fig. 2 is an end elevation;

Fig. 3 is a plan view of the magnet and its connection with the saw frame;

Fig. 4 is a longitudinal section through the saw arbor and the slidable connections of the saw therewith; and Fig. 5 is a diagram of the electric circuits controlling the operation of the saw.

Referring to the drawings, 1, 1, indicate two channel sections for the base of the machine, which are connected and properly spaced by bolts and thimbles 2, 2, and carry two end sills 3, 3. Bolted to the upper flange of one of the channels 1 are two standards 4, 4, each provided with two vertically spaced brackets 5, 5, having at their outer ends aligning sockets 6 in which are held rods 7 which carry at their adjacent ends a pair of clamping jaws 8, 8, adapted to support in position a tube guide 9, which latter is of proper diameter to receive a tube $t$ from the tube making machine and guide the same accurately through the cutting machine. The jaws 8 are removably connected to the rods 7 by set screws, such as 8', or any other obvious and suitable means, and the rods are adjustable in their supports, so that various sized tube guides may be applied to the machine by substituting proper sized guides 9 and adjusting the carrying rods 7 therefor to accommodate the particular tube guides selected.

Mounted on the cross sills 3 adjacent their front ends are clamping blocks 10 adapted to securely clamp a cross shaft 11 upon which are mounted two vertical arms 12, 12, in the upper ends of which is journalled a shaft 13, parallel with the shaft 11. Fixed to the shaft 13 is a frame 14 provided on its upper portion with spaced journal bearings 15, 15, in which the arbor 16 of the cutting saw 17 is journalled, the parts being so disposed that the frame 14 and the saw arbor 16 may be swung toward and from the axis of the tube guide to move the saw into and out of the path of movement of the tube as the latter is fed through the machine.

The means for swinging the saw frame to bring the saw into operative position to cut the tube into the desired lengths, comprises an electro-magnet 20, supported in a bracket 21, attached to one of the vertical arms 12, said magnet preferably being of the solenoid type, and the armature or plunger thereof being provided with a rod 22 connected to the outer end of a swinging link 23, the opposite end of which is pivoted to one of the arms 12. Intermediate the length of the link 23 is connected a link 24 which in turn is connected at its upper end to a rock lever 25, loosely mounted on shaft 13. A disc 26 provided with an arcuate slot 27, is fixed to said shaft 13, and the rock lever 25 is connected to said disc by a bolt 28, which engages in the slot 27, and is adjustable therein to vary the extent of rotary movement of said disc, which latter in turn controls the movement of shaft 13 and the extent of swinging movement of the saw-carrying frame 14. The rock lever 25 is provided with an arm 30, the end of which works in the U-shaped end of a stop member 31 secured to the arm 12, the co-operation between the arm 30 and the stop 31 determining the extent of movement of the lever 25.

Adjustably secured to the shaft 11 is an arm 33 carrying a curved guard plate 34 partly surrounding the saw.

The saw arbor 16 comprises a tube journalled in the bearings 15, 15, on the saw frame 14, said arbor being provided at one end with a pulley 40. The saw 17 is mounted for longitudinal sliding movement on the arbor 16 and is carried by a sleeve 41 having a flanged head on one end (see Fig. 4) against which the saw is clamped by a clamping-nut 42 engaging a screw-threaded shoulder 44 on the sleeve. The sleeve 41 carries a cross-pin 45, which engages elongated slots 46 in opposite sides of the arbor, so as to cause the saw and its supporting sleeve to rotate with the arbor and at the same time permit a movement of the saw longitudinally of the arbor.

A helical spring 47 positioned within the arbor is connected at one end to the cross-pin 45 of the sleeve 41 and at its other end to a cross-pin 48 secured to the arbor. This spring acts to yieldingly hold the saw in a normal position with one end of its supporting sleeve 41 abutting the adjacent journal bearing 15, said spring, however, permitting a bodily movement of the saw and its sleeve along the arbor while the saw is in cutting engagement with the tubing, and, after the cutting operation has been completed, operating to return the saw to its normal position.

A collar 49 held to the arbor by the pin 48 cooperates with the hub of the pulley 40 to engage opposite ends of the adjacent journal bearing 15 and hold the arbor against axial movement in its bearings.

Rotary motion is imparted to the saw arbor by a belt 50, engaging the pulley 40 and a pulley 51 loosely journalled on the shaft 13, which pulley 51 is also engaged by a belt 52 which in turn receives its power from any suitable source, such as a jack shaft, or, if desired, a separate motor mounted adjacent the base of the machine.

In order to determine and regulate the lengths of the tube sections to be cut by the machine, the latter is provided with a longitudinally adjustable rod 55, mounted in blocks 56 on the upper ends of the standards 4 and securely locked in position in said blocks by set-screws. Adjustably mounted on the outer end of the rod 55 is a yoke 57, on the free end of which is pivotally suspended a pendular arm 58 adapted to be engaged by the end of the tube to be cut as the latter is fed through the machine. Mounted upon a pivotal axis 59 of the arm 58 is a disc 60, carrying suitable electrical contact members adapted to be moved into and out of engagement with stationary contact members 61 and 62 carried by an insulating block mounted on the yoke 57, so that when the electrical contacts are moved into engagement by the swinging of the arm 58, when the latter is engaged by the advancing tube, an electrical circuit is closed through the magnet 20. The circuit aforesaid is diagrammatically illustrated in Fig. 5, and includes, in addition to the elements described, a circuit element controlled by a push-button 65, which admits of the circuit being closed manually and the magnet energized to cut off the advancing tube at any desired point in its travel, and independently of the automatic gauge mechanism.

The operation of the machine is as follows:—

The tubing, as the same is delivered from the tube forming machine, is fed into the end of the tube guide 9, which latter is preferably made of a section of brass tubing of proper diameter to receive the manufactured tubing, and is held securely in the clamping jaws 8 with its inner end extending to a point approximate the inner limit of movement of the saw on its supporting arbor. As the tubing is fed through the tube guide, its outer end engages the swinging arm 58 of the gauge device and moves said arm on its pivot 59 and closes the electric circuit from the source of supply, through contacts 61 and 62, thereby energizing magnet 20, which attracts and elevates its core, causing rod 22 to lift the outer end of pivoted lever 23, thereby elevating link 24 and rocking lever 25, which, by reason of its connection with disc 26 by bolt 28 and slot 27, moves said disc and shaft 13 through a partial rotation, the extent of the movement of the disc and shaft being regulated by adjusting the bolt 28 in the slot 27 to adjust the movement of the saw to tubes of different diameters. The rotary movement of the shaft 13 swings the frame 14 forward and moves the saw into engagement with the tubing passing through the tube guide. As the movement of the tubing through the guide is continuous and substantially uniform, and as an appreciable time is required for the saw to cut through the tubing, it is necessary that the saw partake of the longitudinal movement of the tubing through the machine during the cutting operation, which is effected by the tubing, while the latter is being cut, moving the rotating saw and its supporting sleeve longitudinally of the saw arbor against the tension of the spring 47. As soon as the length of tubing has been completely severed by the saw, it drops away, thereby permitting the lever 58 to swing back to vertical position and interrupt the circuit of the magnet 20, de-energizing the latter and permitting the saw-carrying frame to drop back to inoperative position and retract the saw from the path of travel of the tubing, in which position it remains until the advancing end of the tubing again engages the pendular lever 58 and causes the latter to close the circuit to the magnet 20, when the operation as described is repeated.

It will be apparent that by either adjusting the gauge rod 55 longitudinally in its supports, or by adjusting the yoke 57 on said rod, the tubing may be uniformly cut to any desired length, and the operation will be entirely automatic. Should it be found necessary or desirable to cut off a length of tubing before the end of the tubing reaches the lever 58, it is only necessary to close the circuit to the magnet by the push-button 65, when the magnet will be energized and the saw swung to operative position as before, and, as soon as the tube end has been severed, the push-button is released, the magnet de-energized, and the saw and its supporting frame permitted to again swing to inoperative position.

While the apparatus has been described as particularly applicable to cutting tubing of varying sizes into various predetermined lengths, it will be understood that it is not limited to this particular object but may be employed for cutting rods or other shapes into desired lengths.

What I claim is:

1. A machine for cutting continuous lengths of material into sections, comprising means for guiding the material through the machine, cutting means movable toward and from the path of movement of said material and also directly movable by and with the material upon engagement therewith, and means including an electro-magnet actuated by engagement with the material to move the cutting means into cutting relation.

2. A machine for cutting continuous lengths of material into sections, comprising means for guiding the material through the machine, cutting means movable toward and from the path of movement of said material and also directly movable by and with the material upon engagement therewith, and adjustable means including an electro-magnet actuated by engagement with the material to move the cutting means into cutting relation.

3. A machine for cutting continuous lengths of material into sections, comprising means for guiding the material through the machine, cutting means movable toward and from the path of movement of said material and also directly movable by and with the material upon engagement therewith, electro-magnetic means for moving the cutting means into cutting relation, and a switch device controlling the circuit to the electro-magnet said switch device being actuated by the end of the advancing material.

4. A machine for cutting continuous lengths of material into sections, comprising a supporting frame, a guide for the material carried by the frame, a swinging frame movable toward and from the path of movement of the material, a rotating arbor on said swinging frame substantially parallel with the longitudinal axis of said guide, a cutter on said arbor rotating therewith and movable longitudinally thereof solely by the engagement of said cutter with the advancing material, an electro-magnet, means connecting the same to the swinging frame to move the same and the cutter into operative position, and a switch device actuated by the advance of the material controlling the circuit of the electro-magnet.

5. A machine for cutting continuous lengths of material into sections, comprising a supporting frame, a guide for the material carried by the frame, a swinging frame movable toward and from the path of movement of the material, a rotating arbor on said swinging frame substantially parallel with the longitudinal axis of said guide, a cutter on said arbor, a pin and slot connection between the arbor and cutter to cause the cutter to rotate with the arbor and to be moved longitudinally of the arbor solely by the engagement of said cutter with the advancing material, a spring connecting the cutter and arbor to return the cutter after a cutting operation, an electro-magnet, means connecting the same to the swinging frame to move the latter and bring the cutter into engagement with the material, and a switch device actuated by the advance of the material controlling the circuit of the electro-magnet.

6. A machine for cutting continuous lengths of material into sections, comprising a supporting frame, a guide for the material carried by the frame, a swinging frame movable toward and from the path of movement of the material, a rotating arbor on said swinging frame substantially parallel with the longitudinal axis of said guide, a cutter on said arbor rotating therewith and movable longitudinally thereof solely by the engagement of said cutter with the advancing material, an electro-magnet, means connecting the same to the swinging frame to cause the latter to move the cutter into engagement with the material, and an adjustable gauge device carried by the supporting frame including a movable detent in the path of movement of the material and a switch device controlled by said detent to close the circuit to said electro-magnet.

7. A machine for cutting continuous lengths of tubing and the like into sections, comprising a supporting frame, a tubular guide carried thereby, a swinging frame mounted on the supporting frame and movable toward and from the guide, a rotating arbor journalled in said swinging frame in substantial parallelism with the tubular guide, a cutter on said arbor rotating therewith and movable longitudinally thereof solely by the engagement of said cutter with the advancing tube, an electro-magnet connected with said swinging frame to move the latter and the cutter into operative position with respect to the tubing to be cut, and an adjustable gauge device including a movable detent in the path of movement of the tubing and a switch controlled by said detent for closing the circuit to the magnet when said detent is actuated by the advancing tubing.

In testimony whereof I affix my signature.

HAROLD WESLEY OSTRANDER.